(12) United States Patent
Li et al.

(10) Patent No.: US 9,052,515 B2
(45) Date of Patent: Jun. 9, 2015

(54) LENS PANEL, METHOD FOR MANUFACTURING THE SAME AND 3D DISPLAY DEVICE

(71) Applicant: BOE TECHNOLOGY GROUP CO., LTD., Beijing (CN)

(72) Inventors: Mingchao Li, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 13/824,799

(22) PCT Filed: Dec. 10, 2012

(86) PCT No.: PCT/CN2012/086314
§ 371 (c)(1),
(2) Date: Mar. 18, 2013

(87) PCT Pub. No.: WO2013/143320
PCT Pub. Date: Oct. 3, 2013

(65) Prior Publication Data
US 2014/0055694 A1 Feb. 27, 2014

(30) Foreign Application Priority Data
Mar. 26, 2012 (CN) .......................... 2012 1 0082426

(51) Int. Cl.
*G02F 1/1343* (2006.01)
*G02B 27/22* (2006.01)
*G02B 3/14* (2006.01)
*G02F 1/13* (2006.01)
*G02F 1/29* (2006.01)
*H04N 13/04* (2006.01)

(52) U.S. Cl.
CPC ....... *G02B 27/2214* (2013.01); *Y10T 156/1089* (2015.01); *G02F 1/134363* (2013.01);
(Continued)

(58) Field of Classification Search
CPC ............ G02F 1/1313; G02F 1/134363; G02B 27/2214; G02B 3/14; H04N 13/0452
USPC ...................... 349/15, 200; 359/253, 295, 666
See application file for complete search history.

(56) References Cited

U.S. PATENT DOCUMENTS

| 2007/0070509 A1 | 3/2007 | Yeh et al. |
| 2007/0139748 A1 | 6/2007 | Kuiper et al. |
| 2012/0069255 A1 | 3/2012 | Takagi et al. |

FOREIGN PATENT DOCUMENTS

| CN | 1930496 A | 3/2007 |
| CN | 101097264 A | 1/2008 |

(Continued)

OTHER PUBLICATIONS

International Preliminary Report on Patentability Appln. No. PCT/CN2012/086314; Dated Oct. 1, 2014.

(Continued)

*Primary Examiner* — Michael Caley
(74) *Attorney, Agent, or Firm* — Ladas & Parry LLP (57) ABSTRACT

According to embodiments of the present invention, there are provided a lens panel, a method for manufacturing the same and a 3D display device. The lens panel comprises: a first transparent substrate; a second transparent substrate, disposed opposite to the first transparent substrate; positive electrodes and negative electrodes, which are in a strip shape, and disposed on a side of the first transparent substrate opposed to the second transparent substrate parallel to each other and alternately; a second transparent liquid and a first transparent liquid filled between the first transparent substrate and the second transparent substrate in this order from the second transparent substrate to the first transparent substrate, the first transparent liquid and the second transparent liquid being immiscible, and reflectance of the first transparent liquid being larger than reflectance of the second transparent liquid.

10 Claims, 5 Drawing Sheets

(52) U.S. Cl.
CPC  *G02B3/14* (2013.01); *G02B 27/22* (2013.01); *G02F 1/1313* (2013.01); *G02F 1/1343* (2013.01); *G02F 1/29* (2013.01); *H04N 13/04* (2013.01); *G02F 2001/294* (2013.01); *H04N 13/0452* (2013.01)

(56) References Cited

FOREIGN PATENT DOCUMENTS

| | | | |
|---|---|---|---|
| CN | 102231033 A | 11/2011 | |
| CN | 102338895 A | 2/2012 | |
| CN | 102341743 A | 2/2012 | |
| CN | 102707344 A | 10/2012 | |
| JP | 2001-013306 A | 1/2001 | |

OTHER PUBLICATIONS

First Chinese Office Action dated Oct. 8, 2013; Appln. No. 201210082426.7.

International Search Report mailed Mar. 21, 2013; PCT/CN2012/086314.

Chinese Rejection Decision dated Jan. 27, 2015; Appln. No. 201210082426.7

LENS PANEL, METHOD FOR MANUFACTURING THE SAME AND 3D DISPLAY DEVICE

BACKGROUND

Embodiments of the present invention relate to a lens panel, a method for manufacturing the same and a three-dimensional (3D) display device.

In accordance with the principle, existing 3D display technologies are classified into many kinds, such as, a polarized glasses type, a lenticular lens grating type, a prism type, volumetric three-dimensional, holographic stereogram, etc. Among these kinds, a 3D display technology based on a lenticular lens grating is now being in wide use because the lenticular lens grating has characteristics of high machinability and better stereoscopic display effect. However, it is difficult for the 3D display technology based on the lenticular lens grating to realize conversion between 2D and 3D.

SUMMARY

According to embodiments of the invention, there are provided a lens panel, a method for manufacturing the same and a 3D display device, capable of realizing conversion between 2D and 3D conveniently.

According to an embodiment of the invention, there is provided a lens panel, comprising: a first transparent substrate; a second transparent substrate, disposed opposite to the first transparent substrate; positive electrodes and negative electrodes, which are in a strip shape, and disposed on a side of the first transparent substrate opposed to the second transparent substrate parallel to each other and alternately; a second transparent liquid and a first transparent liquid filled between the first transparent substrate and the second transparent substrate in this order from the second transparent substrate to the first transparent substrate, the first transparent liquid and the second transparent liquid being immiscible, and reflectance of the first transparent liquid being larger than reflectance of the second transparent liquid. Optionally, the lens panel further comprises: a dielectric layer provided between the first transparent substrate and the second transparent liquid.

Optionally, in the above lens panel, on a side of the second transparent substrate opposed to the first substrate, there is formed a plate-like common electrode layer, and a vertical electric field can be formed between the plate-like common electrode layer and the positive electrodes or the negative electrodes.

Optionally, in the above lens panel, pitches between any two adjacent electrodes on the first transparent substrate are the same.

Optionally, in the above lens panel, an electrode pitch in a central region on the first transparent substrate is larger than an electrode pitch in a marginal region on it.

Optionally, in the above lens panel, the second transparent liquid is glycerol, diglycol, ethylene glycol or n-hexanol.

Optionally, in the above lens panel, the first transparent liquid is an optical fluid.

Optionally, in the above lens panel, the optical fluid is liquid crystal or liquid crystal polymer.

According to an embodiment of the present invention, there is provided a method for manufacturing a lens panel, comprising: producing positive electrodes and negative electrodes which are in a strip shape on an inner surface of a first transparent substrate, the positive electrodes and the negative electrodes being arranged parallel and alternately on the first transparent substrate; applying a mixed liquid of a first transparent liquid and a second transparent liquid on the first transparent substrate with the positive electrodes and negative electrodes produced; performing a bonding process on the first transparent substrate and the second transparent substrate, so as to attain the lens panel, wherein the first transparent liquid and the second transparent liquid are located between the first transparent substrate and the second transparent substrate.

Optionally, the above manufacturing method further comprises: after the step of producing the positive electrodes and the negative electrodes and before the mixed liquid of the first transparent liquid and the second transparent liquid is applied on the first transparent substrate with the positive electrodes and negative electrodes produced, a dielectric layer is produced on the first transparent substrate.

Optionally, the above manufacturing method further comprises: prior to the bonding process, a common electrode layer is formed on a surface of the second transparent substrate opposed to the first transparent substrate.

According to an embodiment of the invention, there is provided a 3D display device, comprising: a display panel; the lens panel as stated above, bonded to a light exiting side of the display panel; and a control unit for controlling the lens panel, wherein, when a 3D image is displayed by the 3D display device, a voltage is applied to the positive electrode and the negative electrode of the lens panel by the control unit; and when a 2D image is displayed by the display device, no voltage is applied to the positive electrode and the negative electrode of the lens panel by the control unit.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, a technical solution and advantages of embodiments of the present application more apparent, the technical solutions of the embodiments will be described in a clearly and fully understandable way in connection with the drawings related to the embodiments of the present application. It is obvious that the described embodiments are just a part but not all of the embodiments of the invention. Based on the described embodiments herein, those skilled in the art can obtain other embodiment(s), without any inventive work, which should be within the scope of the invention.

According to an embodiment of the invention, there is provided a lens panel. The structure of the lens panel according to the embodiment of the invention will be described in detail below with reference to accompanied drawings.

Figure 1:
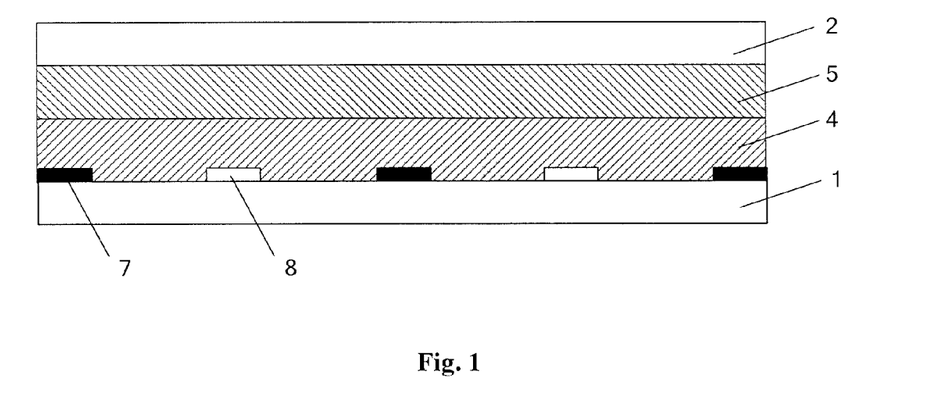
FIG. 1 is a structurally schematic view showing a lens panel according to an embodiment of the invention.

FIG. 1 is a structurally schematic view showing the lens panel according to the embodiment of the invention. Referring to FIG. 1, the lens panel comprises: a first transparent substrate 1; positive electrodes 7 and negative electrodes 8, arranged parallel to each other and alternately, formed into a strip shape and disposed on an inner surface of the first transparent substrate 1, i.e., at a side of the first transparent substrate 1 opposed to a second transparent substrate 2; a second transparent substrate 2, disposed opposite to the first transparent substrate 1; a second transparent liquid 5 and a first transparent liquid 4, which are filled between the first transparent substrate 1 and the second transparent substrate 2 in this order from the second transparent substrate to the first transparent substrate.

Figure 9:
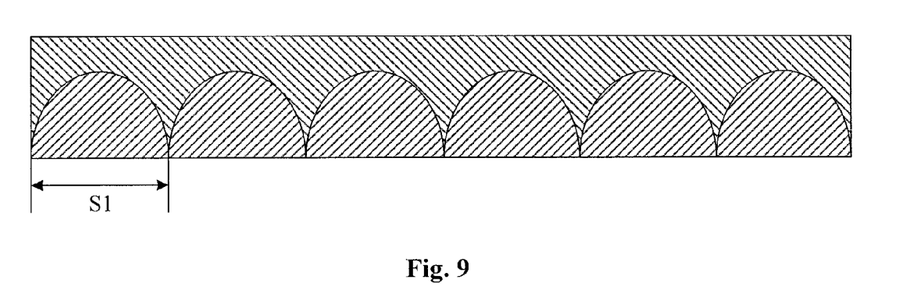
FIG. 9 is a schematic view showing a fluid shape profile in a lens panel according to an embodiment of the invention.
Figure 10:
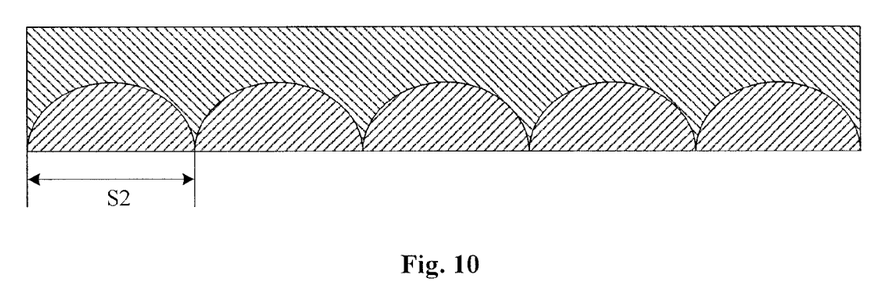
FIG. 10 is a schematic view showing another fluid shape profile in a lens panel according to an embodiment of the invention.

Exemplarily, pitches between any two adjacent electrodes on the first transparent substrate 1 may be the same, as shown in FIG. 9 and FIG. 10. A proper electrode pitch can be selected according to different viewing distances. For example, in FIG. 9, the electrode pitch is S1, and in FIG. 10, the electrode pitch is S2.

Exemplarily, the electrode pitch can be obtained by calculating according to a formula:

$$d=(N^2 *E*P)/8D*\text{delt } n,$$

where D is a viewing distance, P is a pixel pitch of a liquid crystal panel, N is the number of viewing points, E is a distance between two eyes (about 65 mm), and delt n is an anisotropy coefficient of liquid crystals. For example, when P=5 μm, D=2 m, N=4, E=65 mm, and Delt n=0.1, the electrode pitch d=1.7 μm.

Figure 4:
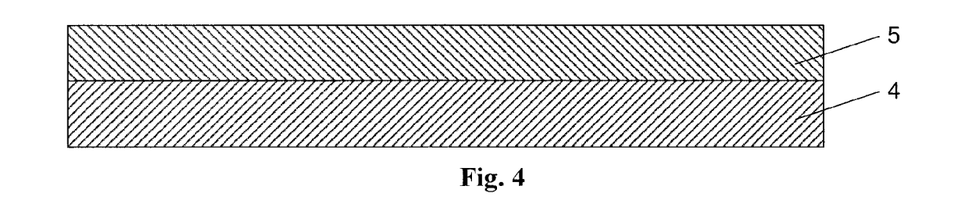
FIG. 4 is a schematic view showing a mixed liquid of a first transparent liquid and a second transparent liquid in the method for manufacturing the lens panel.
Figure 11:
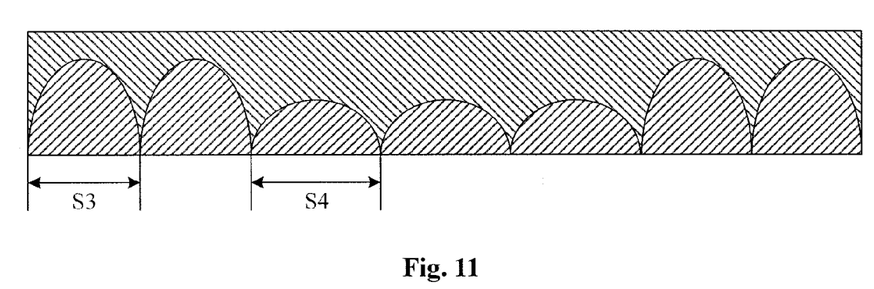
FIG. 11 is a schematic view showing still another fluid shape profile in a lens panel according to an embodiment of the invention.

Alternatively, pitches between adjacent electrodes on the first transparent substrate 1 may also differ. For example, on the first transparent substrate 1, an electrode pitch in a central region is larger than an electrode pitch in a marginal region. Regions can be driven separately by selecting different driving voltages, so that the anisotropy of liquid crystals changes differently and thereby refracted lights reach different positions. Thus, a high-quality picture can be seen at each of regions with different viewing angles. As shown in FIG. 11, the electrode pitch in the marginal region is S3, the electrode pitch in the central region is S4, and S3<S4.

Wherein the first transparent liquid 4 and the second transparent liquid 5 (as shown in FIG. 4) are immiscible to each other and have similar densities and dielectric constants which differ to a relatively large extent, and the density of the first transparent liquid 4 is slightly larger than that of the second transparent liquid 5. Additionally, reflectances of these two transparent liquids differ from each other, and the reflectance of the first transparent liquid 4 is larger than the reflectance of the second transparent liquid 5.

The second transparent liquid 5 may adopt an alcohol structure material, such as glycerol, diglycol, ethylene glycol, n-hexanol or the like, and it has a dielectric constant of approximately 42, a reflectance of approximately 1.47 and a density of approximately 1.26 g/cm$^3$. The first transparent liquid 4 may adopt, for example, optical fluids. The optical fluids are fluids having optical anisotropy, and materials having optical anisotropy, such as liquid crystals, liquid crystal polymers or others may be used.

Figure 6:
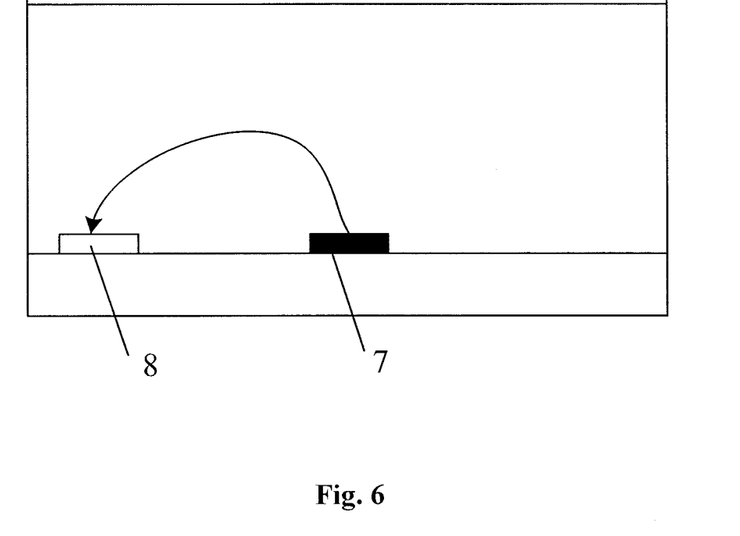
FIG. 6 is a schematic view showing distribution of a horizontal electric field in a lens panel according to an embodiment of the invention.

Wherein, the positive electrodes 7 and the negative electrodes 8 are arranged alternately on the inner surface of the first transparent substrate 1. As shown in FIG. 6, a horizontal electric field is formed between the positive electrode 7 and the negative electrode 8 by applying a voltage between the positive electrode 7 and the negative electrode 8. The horizontal electric field is capable of changing the shape of the first transparent liquid 4, i.e. changing the shape of an interface between the first transparent liquid 4 and the second transparent liquid 5. The voltage applied between the positive and negative electrodes has a fixed value, and is related to parameters of liquid crystals. The only requirement of the voltage is that the first transparent liquid 4 can be driven by it, and when the lens panel operates, the voltage is maintained to be constant.

Figure 2:
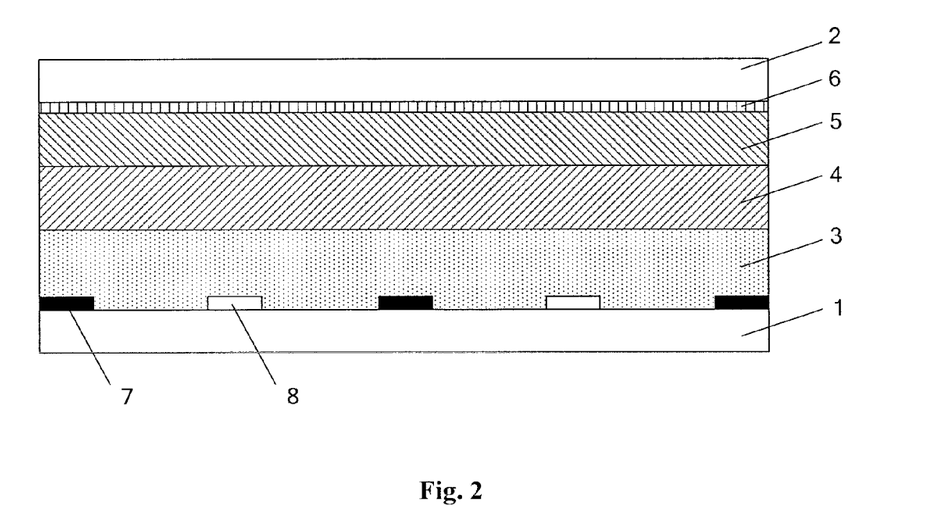
FIG. 2 is a structurally schematic view showing a lens panel according to another embodiment of the invention.
Figure 7:
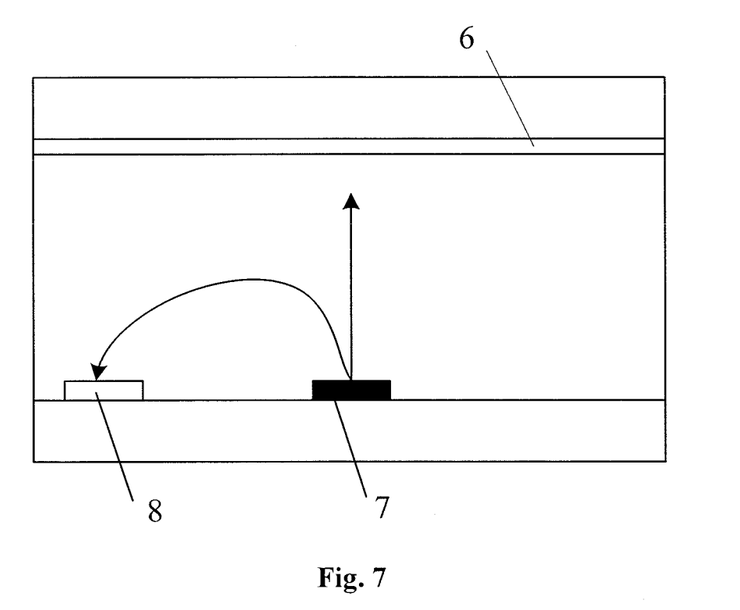
FIG. 7 is a schematic view showing distribution of a horizontal electric field and a vertical electric field in a lens panel according to an embodiment of the invention.

Optionally, as shown in FIG. 2, a transparent electrode layer (common electrode) 6, such as a layer of ITO or IZO, is formed on an inner surface of the second transparent substrate 2 (at a side opposed to the first transparent substrate 1). As shown in FIG. 7, a vertical electric field can be formed between the transparent electrode layer 6 and the positive electrodes 7 or the negative electrodes 8. Because the positive and negative electrodes are capable of producing the horizontal electric field, the fluid shape in a liquid lens can be controlled conveniently by utilizing the interaction between the horizontal electric field and the vertical electric field, and thus, each liquid lens unit is capable of being shown in a parabola-shaped arrangement. When the liquid lens is applied to 3D display, by means of controlling voltage across electrodes, the shape of an optical fluid is normatively controlled with the use of potential lines, so as to have an effect of forming or not forming a lens. Thus, conversion between 2D and 3D can be achieved conveniently.

Figure 3:
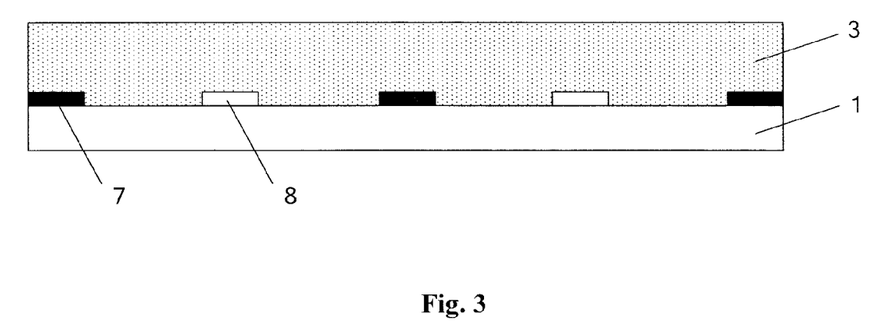
FIG. 3 is a schematic view showing formation of positive and negative electrodes and a dielectric layer on a first transparent substrate in a method for manufacturing a lens panel.

Optionally, in order to make the shape of the first transparent liquid 4 more ideal, as shown in FIGS. 2 and 3, a dielectric layer 3 can be further provided between the first transparent substrate 1 and the first transparent liquid 4. With the provision of the dielectric layer 3, a part of electric field lines is sheltered by the dielectric layer. This can make the first transparent liquid 4 and the second transparent liquid 5 being located in an electric field region in which the electric field lines take the shape of a relatively perfect circular arc.

Accordingly, with regarding to the lens panel according to the embodiment of the invention, the strip-shaped positive and negative electrodes are disposed alternately on the inner surface of the first transparent substrate. When 3D display is needed, the shape of an interface between the first transparent liquid and the second transparent liquid can be changed by applying a voltage between the positive electrode and the negative electrode, and thereby, an effect of lens is formed. If no voltage is applied to each of the electrodes, then the shape of the interface between the first transparent liquid and the second transparent liquid will not be changed, and at this time, 2D display is conducted by the display device. In this way, the conversion between 2D and 3D can be achieved conveniently.

According to another embodiment of the invention, there is provided a method for manufacturing the lens panel as mentioned above. The method for manufacturing the transparent panel according to the embodiment of the invention will be described in detail below.

The method for manufacturing the lens panel according to the embodiment of the invention comprises the following steps:

Step 201: positive electrodes and negative electrodes which are in a strip shape are produced on an inner surface of a first transparent substrate;

The positive electrodes and the negative electrodes are arranged parallel and alternately on the first transparent substrate. Optionally, lengths and widths of the positive and negative electrodes are equal to each other, respectively, and pitches between adjacent electrodes are also equal.

In addition, a length value and a width value of the electrode can be set according to requirements, and the pitch between two adjacent electrodes can also be set according to requirements. The optimal effect of setting the pitch between two adjacent electrodes and the width value should be: the arrangement shape of electric field lines is made to be a perfect circular arc.

Step 202: a dielectric layer is produced on the first transparent substrate with the positive electrodes and the negative electrodes produced;

The provision of the dielectric layer can make a first transparent liquid 4 and a second transparent liquid 5 being located in an electric field region in which the electric field lines take the shape of a relatively perfect circular arc. The panel structure subjected to step 201 and step 202 is shown in FIG. 3.

Figure 5:
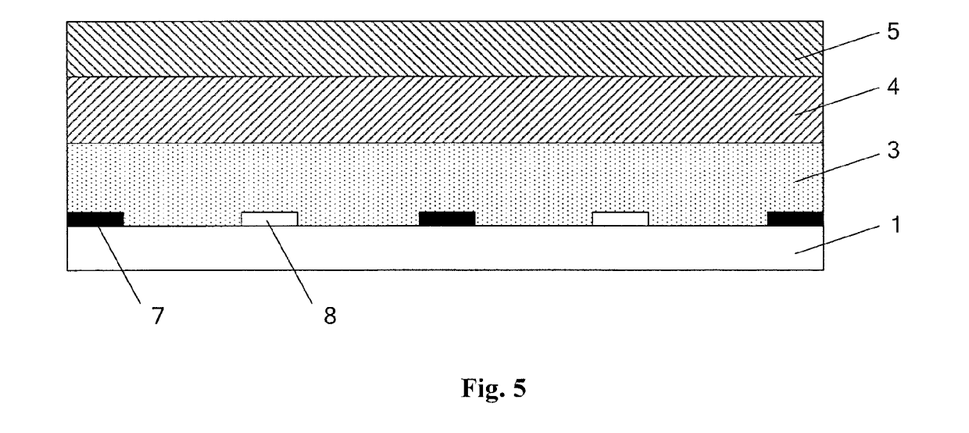
FIG. 5 is a schematic view showing formation of the mixed liquid on the first transparent substrate in the method for manufacturing the lens panel.

Step 203: a mixed liquid of the second transparent liquid and the first transparent liquid is applied on the first transparent substrate obtained by step 202 through coating, dropping, or other conventional process (as shown in FIG. 5).

Wherein the first transparent liquid and the second transparent liquid are immiscible and have similar densities and dielectric constants which differ to a relatively large extent, and the density of the first transparent liquid is slightly larger than that of the second transparent liquid. Additionally, reflectances of these two transparent liquids differ from each other, and the reflectance of the first transparent liquid is larger than the reflectance of the second transparent liquid.

The second transparent liquid may adopt an alcohol structure material, such as glycerol, diglycol, ethylene glycol, n-hexanol or the like, and it has a dielectric constant of approximately 42, a reflectance of approximately 1.47 and a density of approximately 1.26 g/cm3. The first transparent liquid may adopt, such as optical fluids, liquid crystals, liquid crystal polymers or other materials.

Because the first transparent liquid and the second transparent liquid are immiscible, a layered structure shown in FIG. 4, in which the second transparent liquid 5 is located over the first transparent liquid 4, is formed after the two liquids are mixed.

Step 204: a bonding process is performed on the first transparent substrate obtained by step 203 and a second transparent substrate, and the lens panel shown in FIG. 1 is attained.

Alternatively, a transparent electrode layer, such as a layer of ITO, IZO or the like, is formed on an inner surface of the second transparent substrate (on a side opposed to the first transparent substrate).

Afterwards, the lens panel is bonded to a display panel, and a 3D display device capable of performing stereoscopic display can be obtained, wherein the lens panel is bonded to a light exiting side of the display panel.

It is to be noted that, the display panel in the embodiment of the invention may be: a liquid crystal panel, a plasma display panel, an OLED display panel, an electronic paper, or other display panel, and no limit will be set to it here.

If the display panel is the liquid crystal panel, then in the display panel, a TFT array substrate and an opposite substrate are disposed to face each other to form a liquid crystal cell, and liquid crystal material is filled in the liquid crystal cell. The opposite substrate is a color filter substrate, for example. A pixel electrode of each pixel unit of the TFT array substrate is used to apply an electric field, so as to control rotation of the liquid crystal material and to perform displaying operation. In some examples, the liquid crystal display device further comprises a backlight source provided for the display panel.

The operational principle of the lens panel according to embodiments of the invention will be introduced below.

In order to control the shape of the first transparent liquid, a control unit is provided in the lens panel, or alternatively, a control unit is provided in a 3D display device with the lens panel provided. The control unit is capable of applying a voltage between the positive electrode and the negative electrode, and applying a voltage between the transparent electrode layer and the positive electrode or the negative electrode, and the first transparent liquid can be driven by the voltages. The shape of the first transparent liquid is changed when it is driven by the voltages (i.e. the shape of an interface between the first transparent liquid and the second transparent liquid is changed), and then a liquid lens unit is formed. At this time, the display device performs 3D display. If no voltage is applied to individual electrode, then the shape of the first transparent liquid will not be changed because it is not driven by an electric field, that is, the shape of the interface between the first transparent liquid and the second transparent liquid will not be changed. At this time, the display device performs 2D display. In this way, conversion between 2D and 3D can be achieved conveniently.

With regarding to the lens panel according to embodiments of the invention, the positive and negative electrodes are disposed parallel and alternately on the inner surface of the first transparent substrate, and the fluid shape in a liquid lens is easily controlled by a horizontal electric field which is produced by the positive and negative electrodes. Moreover, a transparent electrode layer can be further formed on a side of the second transparent substrate opposed to the first transparent substrate, and a vertical electric field can be formed between the transparent electrode layer and the positive electrodes or the negative electrodes. So, the fluid shape in the liquid lens can be controlled more conveniently by utilizing the interaction between the horizontal electric field and the vertical electric field. Whereby, each liquid lens unit is capable of being shown in a parabola-shaped arrangement. When the liquid lens is applied to 3D display, through control of voltage across electrodes, the shape of an optical fluid is normatively controlled with the use of potential lines, so as to make an effect of lens being formed or not being formed by it. Thus, conversion between 2D and 3D can be achieved conveniently.

Figure 8:
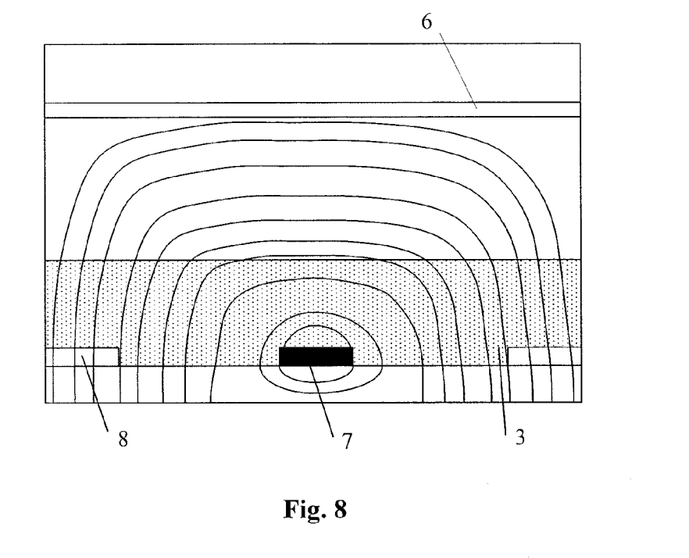
FIG. 8 is a schematic view showing distribution of potential lines under the combined action of a horizontal electric field and a vertical electric field in a lens panel according to an embodiment of the invention.

Wherein, regarding the distribution of the horizontal electric field and the vertical electric field in the lens panel according to embodiments of the invention, please refer to FIG. 7, and regarding the distribution of potential lines under the combined action of the horizontal electric field and the vertical electric field in the lens panel according to embodiments of the invention, please refer to FIG. 8.

In addition, as can be seen from FIG. 8, owing to existence of the dielectric layer 3 between the first transparent substrate and the first transparent liquid, the first transparent liquid 4 (not shown in the figure) and the second transparent liquid 5 (not shown in the figure) can be made to be located in an electric field region in which electric field lines take the shape of a relatively perfect circular arc.

Optionally, pitches between any two adjacent electrodes on the first transparent substrate can be the same. In this case, after a voltage is applied to each electrode, the distribution of the formed fluid shape is shown in FIG. 9. In FIG. 9, the electrode pitch is S1, and after the electrode pitch is increased, the distribution of the formed fluid shape is shown in FIG. 10, in which, the electrode pitch is S2.

Alternatively, pitches between adjacent electrodes on the first transparent substrate may also differ. For example, on the first transparent substrate, an electrode pitch in a central region is larger than an electrode pitch in a marginal region, so a high-quality picture can be seen at each of regions with different viewing angles. In this case, after a voltage is applied across electrodes, the distribution of the formed fluid shape is shown in FIG. 11. In FIG. 11, the electrode pitch in the marginal region is S3, the electrode pitch in the central region is S4, and S3<S4.

If no voltage is applied to any electrode, then the shape of the first transparent liquid will not be changed, and what to be displayed by the display device is a 2D image. Accordingly, the lens panel according to embodiments of the invention can function as a changeover switch for 3D display.

In conclusion, according to the lens panel provided by embodiments of the invention, through control of a voltage across each electrode, the shape of an optical fluid is normatively controlled with the use of potential lines, so as to make it have an effect of formed or not formed a lens. When the lens panel is applied to 3D display, conversion between 2D and 3D can be achieved conveniently. Further, the fabrication process according to embodiments of the invention is simple and its operability is excellent.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A lens panel, comprising:
a first transparent substrate;
a second transparent substrate, disposed opposite to the first transparent substrate;
positive electrodes and negative electrodes, which are in a strip shape, and disposed at a side of the first transparent substrate opposed to the second transparent substrate parallel to each other and alternately;
a second transparent liquid and a first transparent liquid, filled between the first transparent substrate and the second transparent substrate in this order from the second transparent substrate to the first transparent substrate, the first transparent liquid and the second transparent liquid being immiscible, and reflectance of the first transparent liquid being larger than reflectance of the second transparent liquid,
wherein the first transparent liquid is an optical fluid, and the optical fluid is liquid crystal or liquid polymer.

2. The lens panel claimed as claim 1, further comprising:
a dielectric layer, provided between the first transparent substrate and the first transparent liquid.

3. The lens panel claimed as claim 1, wherein,
at a side of the second transparent substrate opposed to the first transparent substrate, there is formed a plate-like common electrode layer.

4. The lens panel claimed as claim 1, wherein,
pitches between any two adjacent electrodes on the first transparent substrate are the same.

5. The lens panel claimed as claim 1, wherein,
on the first transparent substrate, an electrode pitch in a central region is larger than an electrode pitch in a marginal region.

6. The lens panel claimed as claim 1, wherein,
the second transparent liquid is glycerol, diglycol, ethylene glycol or n-hexanol.

7. A manufacturing method of the lens panel claimed as claim 1, comprising:
producing the positive electrodes and the negative electrodes which are in a strip shape on an inner surface of the first transparent substrate, the positive electrodes and the negative electrodes being arranged parallel and alternately on the first transparent substrate;
applying a mixed liquid of the first transparent liquid and the second transparent liquid on the first transparent substrate with the positive electrodes and negative electrodes produced;
performing a bonding process on the first transparent substrate and the second transparent substrate, so as to attain the lens panel, wherein the first transparent liquid and the second transparent liquid are located between the first transparent substrate and the second transparent substrate,
wherein the first transparent liquid is optical fluid, and the optical fluid is liquid crystal or liquid crystal polymer.

8. The manufacturing method claimed as claim 7, further cor aprising:
after the step of producing the positive electrodes and the negative electrodes and before the mixed liquid of the first transparent liquid and the second transparent liquid is applied on the first transparent substrate with the positive electrodes and negative electrodes produced, a dielectric layer is produced on the first transparent substrate.

9. The manufacturing method claimed as claim 7, further comprising:
before the bonding process, a common electrode layer is formed on a surface of the second transparent substrate opposed to the first transparent substrate.

10. A 3D display device, comprising;
a display panel;
the lens panel claimed as claim 1 bonded to a light exiting side of the display panel; and
a control unit for controlling the lens panel,
wherein when a 3D image is displayed by the 3D display device, a voltage is applied to the positive electrodes and the negative electrodes of the lens panel by the control unit; and when a 2D image is displayed by the display device, no voltage is applied to the positive electrodes and the negative electrodes of the lens panel by the control unit.

* * * * *